US 6,710,966 B1

(12) United States Patent
Codilian et al.

(10) Patent No.: US 6,710,966 B1
(45) Date of Patent: Mar. 23, 2004

(54) METHOD FOR REDUCING AN EFFECT OF VIBRATION ON A DISK DRIVE DURING A TRACK FOLLOWING OPERATION BY ADJUSTING AN ADAPTIVE-FILTER GAIN APPLIED TO AN ACCELERATION SENSOR SIGNAL

(75) Inventors: Raffi Codilian, Irvine, CA (US); Aswartha Narayana, Mission Viejo, CA (US); Lan V. Ngo, Garden Grove, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 351 days.

(21) Appl. No.: 10/003,943

(22) Filed: Oct. 23, 2001

(51) Int. Cl.$^7$ ............................................... G11B 5/596
(52) U.S. Cl. ................... 360/77.08; 360/77.02
(58) Field of Search .................. 360/77.08, 77.04, 360/77.02, 75, 77.05, 53, 105

(56) References Cited

U.S. PATENT DOCUMENTS

| | | | | |
|---|---|---|---|---|
| 5,521,772 A | * | 5/1996 | Lee et al. ...................... 360/75 |
| 5,815,350 A | * | 9/1998 | Kennedy et al. ......... 360/256.2 |
| 6,487,035 B1 | * | 11/2002 | Liu et al. ................. 360/77.04 |
| 6,529,344 B1 | * | 3/2003 | Kagami et al. .......... 360/77.08 |
| 6,538,839 B1 | * | 3/2003 | Ryan ....................... 360/77.02 |
| 6,564,110 B1 | * | 5/2003 | Makino et al. ................ 700/56 |
| 6,567,233 B1 | * | 5/2003 | Chew et al. ............. 360/77.05 |
| 6,574,068 B1 | * | 6/2003 | Hampshire et al. ...... 360/77.08 |
| 6,580,579 B1 | * | 6/2003 | Hsin et al. ............... 360/77.02 |
| 6,643,084 B1 | * | 11/2003 | Andrew et al. ............... 360/53 |

* cited by examiner

Primary Examiner—David Hudspeth
Assistant Examiner—Fred F. Tzeng
(74) Attorney, Agent, or Firm—Milad G. Shara, Esq.; Robroy R. Fawcett, Esq.

(57) ABSTRACT

The present invention may be embodied in a method, implemented in a disk drive, for adaptively reducing an effect of vibration during a track following operation. The disk drive includes a disk and a rotary actuator. The disk includes distributed position information in a plurality of servo wedges. The actuator carries a transducer and pivots on a base of the disk drive. The actuator may exhibit an imbalance that may be affected by a linear vibration. In the method, a sensor signal is generated that is responsive to a vibration to the disk drive. The sensor value is modified based on an adaptive-filter gain to generate a position error adjustment signal for modifying a nominal position error signal. The adaptive-filter gain is then altered based on an adjusted position error signal and the sensor value associated with the current servo wedge for use during a next servo wedge.

20 Claims, 4 Drawing Sheets

METHOD FOR REDUCING AN EFFECT OF VIBRATION ON A DISK DRIVE DURING A TRACK FOLLOWING OPERATION BY ADJUSTING AN ADAPTIVE-FILTER GAIN APPLIED TO AN ACCELERATION SENSOR SIGNAL

BACKGROUND OF THE INVENTION

1. Field of the Invention

The present invention relates to digital data storage, and more particularly, to a method of reducing the effect of vibration in a disk drive by adaptively adjusting the gain applied to an acceleration sensor signal.

2. Description of the Prior Art

A hard disk drive generally uses a transducer or "head" located at the end of a rotary actuator to read and write data on a surface of a rotating disk having a magnetic media layer. The rotary actuator may exhibit an effective imbalance that is affected by linear vibrations experienced by the disk drive. Such vibrations may disrupt a track following operation in which a servo control system within the disk drive uses servo control information on the magnetic surface to hold the transducer at a desired track.

Accordingly, there exists a need for a technique for reducing the effect of vibration on a disk having an actuator exhibiting an imbalance during a track following operation. The present invention satisfies these needs.

SUMMARY OF THE INVENTION

The present invention may be embodied in a method, implemented in a disk drive, for adaptively reducing an effect of vibration during a track following operation. The disk drive has a head disk assembly (HDA) including a disk, rotary actuator, a transducer, and a voice coil motor (VCM) circuit. The disk rotates and has a surface coated with a layer of magnetic media. The disk includes distributed position information in a plurality of servo wedges for defining a plurality of concentric data tracks. The rotary actuator pivots relative to a base and has the transducer that periodically reads the position information from the servo wedges. The rotary actuator is coupled to the voice coil motor (VCM) circuit that includes a voice coil motor. The VCM circuit responds to a control effort signal that is periodically adjusted during a track-following operation based on the position information such that the transducer tends to follow a selected track.

In the method, a sensor signal is generated that is responsive to a vibration to the disk drive that tends to cause the rotary actuator to move off-track. The position information is read from a current servo wedge to generate a measured position signal. A nominal position error signal is generated based on a difference between the measured position signal and a target position signal. The sensor signal is read to generate a sensor value associated with the current servo wedge. The sensor value is modified based on a first adaptive-filter gain to generate a position error adjustment signal. The nominal position error signal is adjusted using the position error adjustment signal to generate an adjusted position error signal. A control effort signal is calculated based on the adjusted position error signal, and is output to the VCM circuit. The first adaptive-filter gain is then altered based on the adjusted position error signal and the sensor value associated with the current servo wedge for use during a next servo wedge.

In more detailed features of the invention, the first adaptive-filter gain may be altered for use by the next servo wedge by setting an adaptive filter. The adaptive filter may have one coefficient, or it may have multiple coefficients. The sensor value may be modified by multiplying the sensor value by the first adaptive-filter gain. The nominal position error signal may be adjusted by adding the position error adjustment signal to the nominal position error signal. The rotary actuator may exhibit an effective imbalance that may be affected by a linear vibration.

In other more detailed features of the invention, the control effort signal may be calculated by calculating a nominal control effort signal using the adjusted position error signal, modifying the sensor value based on a second adaptive-filter gain to generate a control effort adjustment signal, and adjusting the nominal control effort signal with the control effort adjustment signal to generate an adjusted control effort signal. The adjusted control effort signal may be output to the VCM circuit. The second adaptive-filter gain then may be altered based on the adjusted position error signal and the sensor value associated with the current servo wedge for use during a next servo wedge. The second adaptive-filter gain may be altered for use during a next servo wedge by setting a second adaptive filter.

BRIEF DESCRIPTION OF THE DRAWINGS

The accompanying drawings illustrate embodiments of the present invention and, together with the description, serve to explain the principles of the invention.

DETAILED DESCRIPTION

Figure 1:
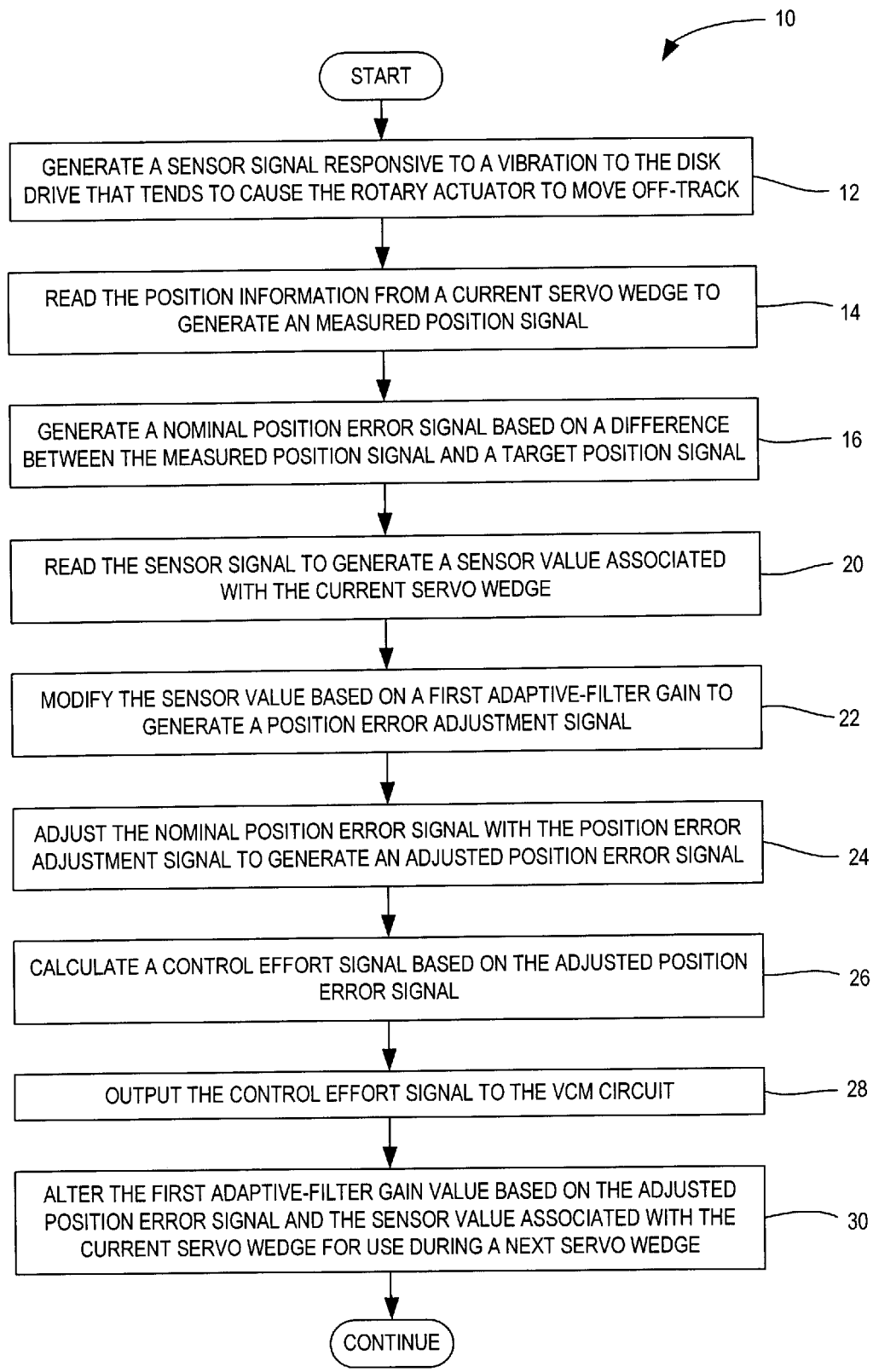
FIG. 1 is a flow diagram of a method for reducing an effect of vibration on a disk drive during a track following operation by adjusting an adaptive-filter gain, according to the present invention.
Figure 2:
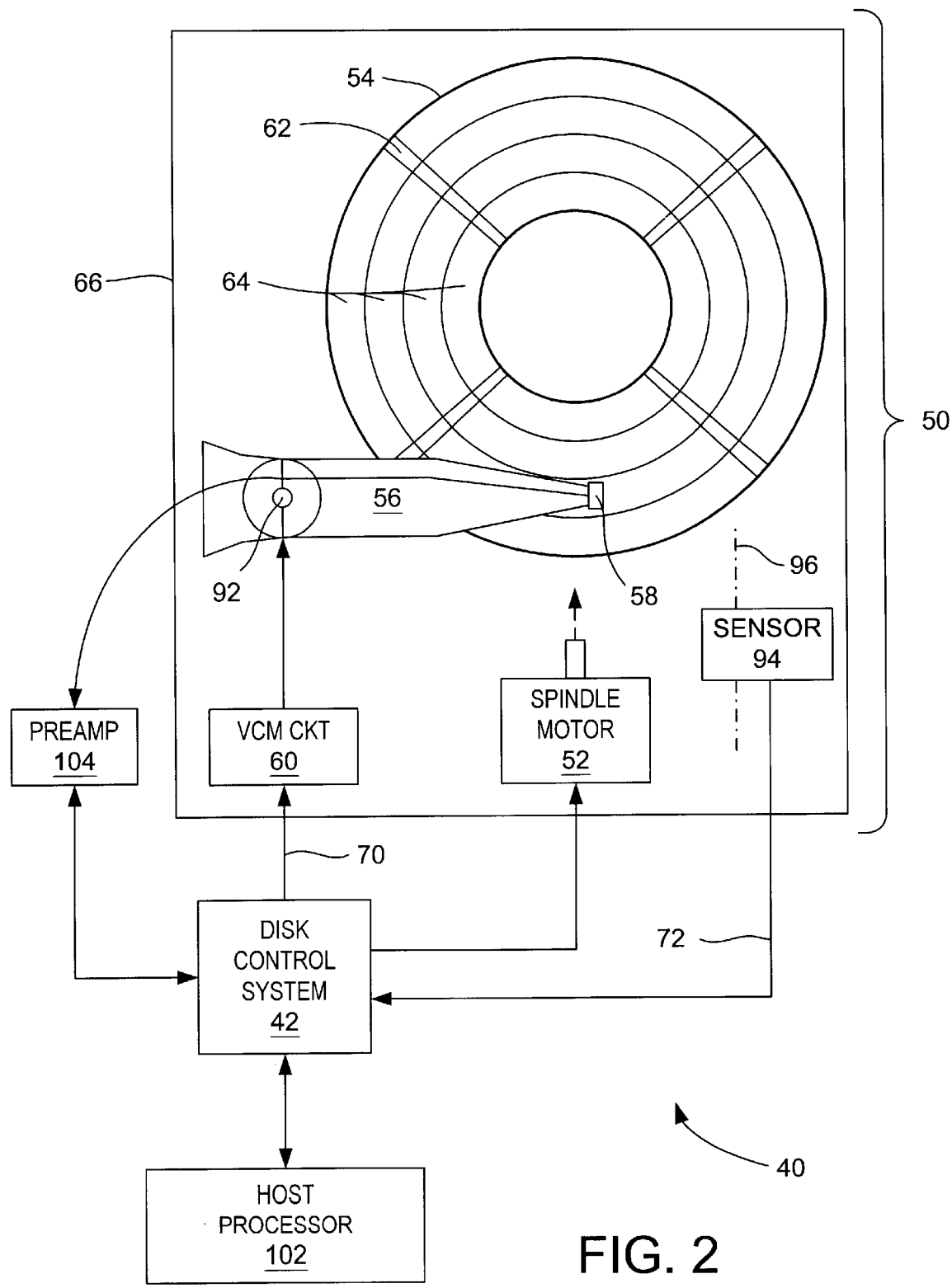
FIG. 2 is a block diagram showing a disk drive for implementing the method of FIG. 1.
Figure 3:
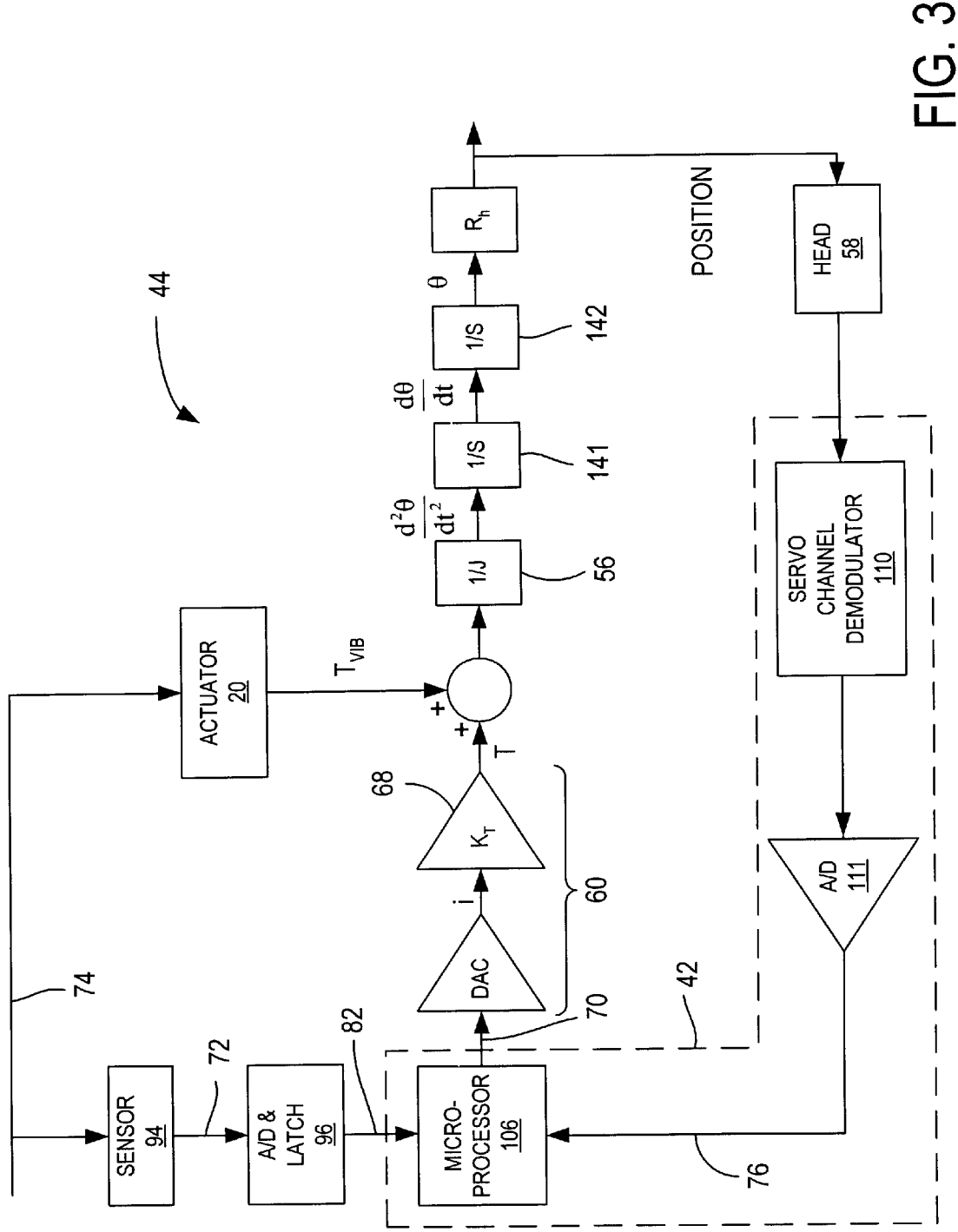
FIG. 3 is a block diagram of a servo control loop for reducing an effect of vibration on a disk drive during a track following operation by adjusting an adaptive-filter gain, according to the present invention.
Figure 4:
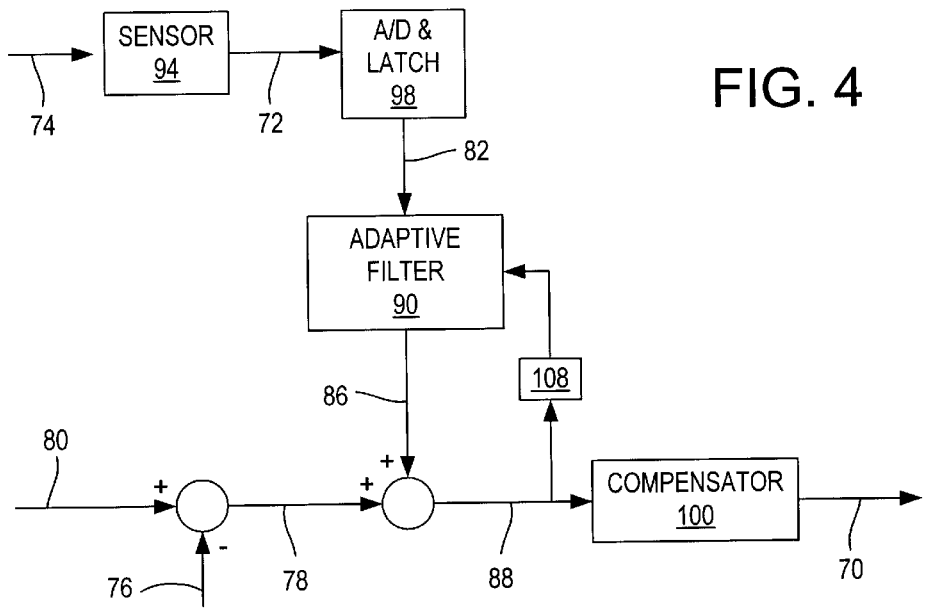
FIG. 4 is a block diagram of a first control structure for adjusting an adaptive-filter gain, according to the present invention.

With reference to FIGS. 1–4, the present invention may be embodied in a method 10 (FIG. 1) implemented in a disk drive 40 (FIG. 2) for adaptively reducing an effect of vibration to the disk drive during a track following operation. The disk drive includes a disk control system 42 that implements the track following operation using a servo control loop 44 (FIG. 3). The disk drive has a head disk assembly (HDA) 50 including a spindle motor 52, a disk 54, rotary actuator 56, a transducer 58, and a voice coil motor (VCM) circuit 60. The disk has a surface coated with a layer of magnetic media and is rotated by the spindle motor. The disk includes distributed position information in a plurality of servo wedges 62 for defining a plurality of concentric data tracks 64. The rotary actuator pivots relative to a base 66 and has the transducer that periodically reads the position information from the servo wedges. The rotary actuator is coupled to the voice coil motor (VCM) circuit that includes a voice coil motor 68 (FIG. 3). The rotary actuator may exhibit an effective imbalance that may be affected by a linear vibration. The VCM circuit responds to a control effort signal 70 that is periodically adjusted during a track-following operation based on the position information such that the transducer tends to follow a selected track.

In the method, a sensor signal 72 is generated (step 12) that is responsive to a vibration 74 to the disk drive 40 that tends to cause the rotary actuator 56 to move off-track. The position information is read from a current servo wedge 62 to generate a measured position signal 76 (step 14). A nominal position error signal 78 (FIG. 4) is generated based on a difference between the measured position signal and a target position signal 80 (step 16). The sensor signal is read to generate a sensor value 82 associated with the current servo wedge (step 20). The sensor value is modified based on a first adaptive-filter gain to generate a position error adjustment signal 86 (step 22). The nominal position error signal is adjusted using the position error adjustment signal to generate an adjusted position error signal 88 (step 24). The control effort signal 70 is calculated based on the adjusted position error signal (step 26) and is output to the VCM circuit 60 (step 28). The first adaptive-filter gain is then altered based on the adjusted position error signal and the sensor value associated with the current servo wedge for use during a next servo wedge (step 30).

The first adaptive-filter gain may be altered for use by the next servo wedge 62 by setting a first adaptive filter 90. The first adaptive filter may have one coefficient, or it may have multiple coefficients, as described below. The sensor value 82 may be modified to generate the position error adjustment signal 86 by multiplying the sensor value by the first adaptive-filter gain. The nominal position error signal 78 may be adjusted to generate the adjusted position error signal by adding the position error adjustment signal 86 to the nominal position error signal.

The rotary actuator 56 pivots about a pivot point 92 using a bearing that may transmit a linear vibration from the base 66 of the disk drive 40 to the rotary actuator. A bearing using a ball bearing generally is not compliant, and a linear vibration to the base is transmitted to the rotary actuator with virtually no delay. However, a bearing using a fluid bearing may exhibit significant compliance, and a vibration to the base may be transmitted to the rotary actuator with a delay. Ideally, the rotary actuator is balanced about the pivot point so that the linear vibration fails to induce a rotary torque $T_{VIB}$ on the actuator. However, the rotary actuator may exhibit an imbalance.

A sensor 94, such as a linear accelerometer, having a sense axis 96 is attached to the base 66, either directly or as a component on a circuit board mounted to the base, for generating the sensor signal 72. The sense axis is substantially aligned with a line that is tangent to an arcuate motion of the actuator 56. Accordingly, the sensor is positioned to detect acceleration components that tend to move an imbalanced actuator 56. The sensor signal may be an analog signal that may be converted to a digital signal by an analog-to-digital (A/D) converter and a latch 98. The control effort signal 70 may be calculated based on the adjusted position error signal 88 using a compensator 100.

The disk control system receives host commands from a host processor 102 and controls responses to the commands. The position information is provided to the disk control system by a preamplifier 104. As mentioned above, the disk control system implements a servo control loop (FIG. 3). The servo control loop is described in more detailed in U.S. patent application Ser. No. 09/728,626, filed Nov. 30, 2000, and titled VIBRATION CANCELLATION IN A DISK DRIVE BY USING AN ACCELERATION SENSOR AND ADAPTIVELY ADJUSTING ITS GAIN TO MINIMIZE EXTERNAL ACCELERATION EFFECTS. The entire disclosure of U.S. patent application Ser. No. 09/728,626 is incorporated herein by reference. The disk control system further includes a microprocessor 106, a servo-channel demodulator 110, an A/D converter 111, nonvolatile memory, dynamic memory, etc. The method of the invention may be implemented as program code stored in the nonvolatile memory and transferred to the dynamic memory for execution by the microprocessor.

The adaptive-filter gain ($G_{NEW}$) for the current servo wedge may be equal to the adaptive-filter gain ($G_{OLD}$) for the last servo wedge minus the adjusted position error value 88 for the last servo wedge (stored in a circuit or register 108) times the sensor value 82, and times a convergence rate factor BETA. When the adaptive filter 90 has multiple coefficients, each coefficient may be similarly calculated using techniques described in U.S. patent application Ser. No. 09/728,626.

Figure 5:
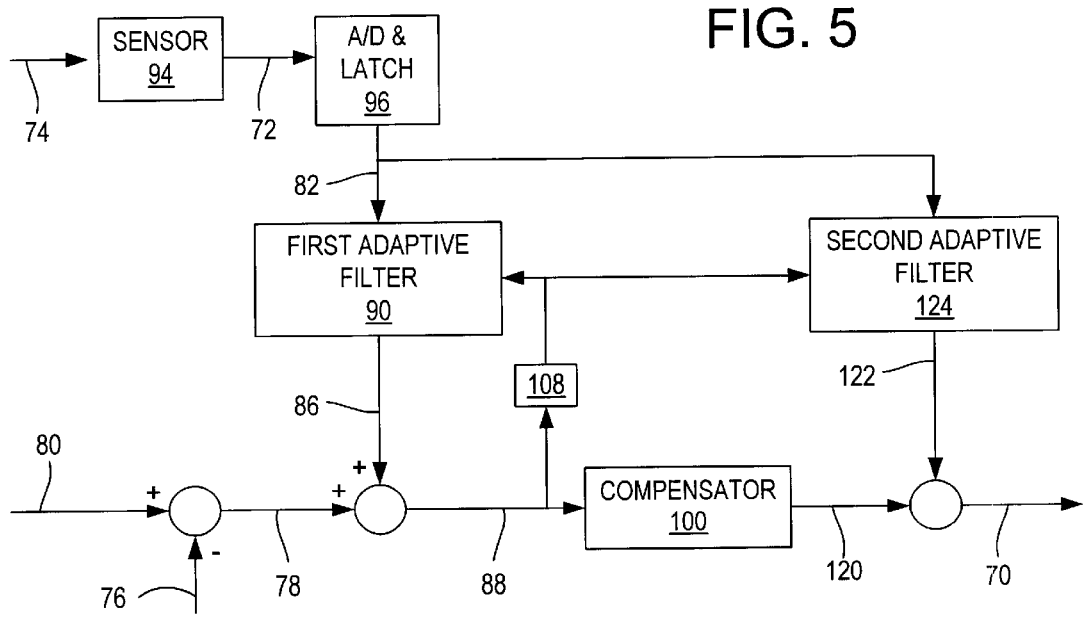
FIG. 5 is a block diagram of a second control structure for adjusting an adaptive-filter gain, according to the present invention.

With reference to FIG. 5, the control effort signal 70 may be calculated by calculating a nominal control effort signal 120 using the adjusted position error signal 88. The sensor value 82 is modified based on a second adaptive-filter gain to generate a control effort adjustment signal 122. The nominal control effort signal is adjusted using the control effort adjustment signal to generate an adjusted control effort signal 70. The adjusted control effort signal may be output to the VCM circuit 60. The second adaptive-filter gain then may be altered based on the adjusted position error signal 88 and the sensor value 82 associated with the current servo wedge for use during a next servo wedge. The second adaptive-filter gain may be altered for use during a next servo wedge by setting a second adaptive filter 124. The second adaptive filter may have one coefficient, or it may have multiple coefficients.

We claim:

1. In a magnetic disk drive having a head disk assembly (HDA) including a rotating disk having distributed position information in a plurality of servo wedges for defining a plurality of concentric data tracks, a rotary actuator that pivots relative to a base and that carries a transducer that periodically reads the position information from the servo wedges, a voice coil motor (VCM) circuit that includes a voice coil motor that is coupled to the rotary actuator, the VCM circuit responding to a control effort signal that is periodically adjusted during a track-following operation based on the position information such that the transducer tends to follow a selected track, a method of adaptively reducing an effect of vibration during the track following operation comprising the steps of:

generating a sensor signal that is responsive to a vibration to the disk drive that tends to cause the rotary actuator to move off-track;

reading the position information from a current servo wedge to generate a measured position signal;

generating a nominal position error signal based on a difference between the measured position signal and a target position signal;

reading the sensor signal to generate a sensor value associated with the current servo wedge;

modifying the sensor value based on a first adaptive-filter gain to generate a position error adjustment signal;

adjusting the nominal position error signal with the position error adjustment signal to generate an adjusted position error signal;

calculating a control effort signal based on the adjusted position error signal;

outputting the control effort signal to the VCM circuit; and altering the first adaptive-filter gain based on the adjusted position error signal and the sensor value associated with the current servo wedge for use during a next servo wedge.

2. A method of adaptively reducing an effect of vibration as defined in claim 1, wherein the step of altering the first adaptive-filter gain based on the adjusted position error signal and the sensor value associated with the current servo wedge for use during a next servo wedge is performed by setting an adaptive filter.

3. A method of adaptively reducing an effect of vibration as defined in claim 2, wherein the adaptive filter has one coefficient.

4. A method of adaptively reducing an effect of vibration as defined in claim 2, wherein the adaptive filter has multiple coefficients.

5. A method of adaptively reducing an effect of vibration as defined in claim 1, wherein:

the step of calculating the control effort signal based on the adjusted position error signal includes:

calculating a nominal control effort signal using the adjusted position error signal, modifying the sensor value based on a second adaptive-filter gain to generate a control effort adjustment signal, adjusting the nominal control effort signal with the control effort adjustment signal to generate an adjusted control effort signal; and the step of outputting the control effort signal to the VCM circuit comprises outputting the adjusted control effort signal to the VCM circuit.

6. A method of adaptively reducing an effect of vibration as defined in claim 5, further comprises altering the second adaptive-filter gain based on the adjusted position error signal and the sensor value associated with the current servo wedge for use during a next servo wedge.

7. A method of adaptively reducing an effect of vibration as defined in claim 5, wherein the step of altering the second adaptive-filter gain based on the adjusted position error signal and the sensor value associated with the current servo wedge for use during a next servo wedge is performed by setting an adaptive filter.

8. A method of adaptively reducing an effect of vibration as defined in claim 1, wherein the step of modifying the sensor value based on the first adaptive-filter gain to generated the position error adjustment signal is performed by multiplying the sensor value by the first adaptive-filter gain.

9. A method of adaptively reducing an effect of vibration as defined in claim 1, wherein the step of adjusting the nominal position error signal with the position error adjustment signal to generate the adjusted position error signal is performed by adding the position error adjustment signal to the nominal position error signal.

10. A method of adaptively reducing an effect of vibration as defined in claim 1, wherein the rotary actuator exhibits an effective imbalance that is affected by a linear vibration.

11. A magnetic disk drive that adaptively reduces an effect of vibration during the track following operation, comprising:

a head disk assembly (HDA) including a rotating disk having distributed position information in a plurality of servo wedges for defining a plurality of concentric data tracks, a rotary actuator that pivots relative to a base and that carries a transducer that periodically reads the position information from the servo wedges, a voice coil motor (VCM) circuit that includes a voice coil motor that is coupled to the rotary actuator, the VCM circuit responsive to a control effort signal that is periodically adjusted during a track-following operation based on the position information such that the transducer tends to follow a selected track, a method of adaptively reducing an effect of vibration during the track following operation comprising the steps of:

means for generating a sensor signal that is responsive to a vibration to the disk drive that tends to cause the rotary actuator to move off-track;

means for reading the position information from a current servo wedge to generate a measured position signal;

means for generating a nominal position error signal based on a difference between the measured position signal and a target position signal;

means for reading the sensor signal to generate a sensor value associated with the current servo wedge;

means for modifying the sensor value based on a first adaptive-filter gain to generate a position error adjustment signal;

means for adjusting the nominal position error signal with the position error adjustment signal to generate an adjusted position error signal;

means for calculating a control effort signal based on the adjusted position error signal;

means for outputting the control effort signal to the VCM circuit; and means for altering the first adaptive-filter gain based on the adjusted position error signal and the sensor value associated with the current servo wedge for use during a next servo wedge.

12. A magnetic disk drive as defined in claim 11, wherein the means for altering the first adaptive-filter gain includes an adaptive filter and first adaptive-filter gain is altered by setting an adaptive filter.

13. A magnetic disk drive as defined in claim 12, wherein the adaptive filter has one coefficient.

14. A magnetic disk drive as defined in claim 12, wherein the adaptive filter has multiple coefficients.

15. A magnetic disk drive as defined in claim 11, wherein:

the means for calculating the control effort signal based on the adjusted position error signal includes means for calculating a nominal control effort signal using the adjusted position error signal, means for modifying the sensor value based on a second adaptive-filter gain to generate a control effort adjustment signal, means for adjusting the nominal control effort signal with the control effort adjustment signal to generate an adjusted control effort signal; and the means for outputting the control effort signal to the VCM circuit outputs the adjusted control effort signal to the VCM circuit.

16. A magnetic disk drive as defined in claim 15, further comprises means for altering the second adaptive-filter gain based on the adjusted position error signal and the sensor value associated with the current servo wedge for use during a next servo wedge.

17. A magnetic disk drive as defined in claim 15, wherein the means for altering the second adaptive-filter gain includes an adaptive filter and first adaptive-filter gain is altered by setting an adaptive filter.

18. A magnetic disk drive as defined in claim 11, wherein the means for modifying the sensor value generates the position error adjustment signal by multiplying the sensor value by the first adaptive-filter gain.

19. A magnetic disk drive as defined in claim 11, wherein the means for adjusting the nominal position error signal generates the adjusted position error signal by adding the position error adjustment signal to the nominal position error signal.

20. A magnetic disk drive as defined in claim 11, wherein the rotary actuator exhibits an effective imbalance that is affected by a linear vibration.

* * * * *